(12) United States Patent
Basham et al.

(10) Patent No.: US 9,423,962 B1
(45) Date of Patent: Aug. 23, 2016

(54) INTELLIGENT SNAPSHOT POINT-IN-TIME MANAGEMENT IN OBJECT STORAGE

(71) Applicant: INTERNATIONAL BUSINESS MACHINES CORPORATION, Armonk, NY (US)

(72) Inventors: Robert B. Basham, Aloha, OR (US); Joseph W. Dain, Vail, AZ (US); Matthew J. Fairhurst, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/942,468

(22) Filed: Nov. 16, 2015

(51) Int. Cl.
*G06F 3/06* (2006.01)
(52) U.S. Cl.
CPC .............. *G06F 3/0604* (2013.01); *G06F 3/065* (2013.01); *G06F 3/0683* (2013.01)
(58) Field of Classification Search
CPC ...... G06F 3/0604; G06F 3/065; G06F 3/0683
See application file for complete search history.

(56) References Cited

U.S. PATENT DOCUMENTS

| | | | |
|---|---|---|---|
| 8,788,764 B2 | 7/2014 | Williams et al. | |
| 9,075,535 B2 | 7/2015 | Beeken et al. | |
| 9,185,188 B1 * | 11/2015 | Li | G06F 9/46 |
| 2007/0185938 A1 * | 8/2007 | Prahlad | G06F 17/30212 |
| 2009/0043978 A1 * | 2/2009 | Sawdon | G06F 17/30221 |
| | | | 711/162 |
| 2009/0150639 A1 * | 6/2009 | Ohata | G06F 3/0608 |
| | | | 711/172 |
| 2010/0153634 A1 * | 6/2010 | Fellinger | G06F 3/0611 |
| | | | 711/104 |
| 2014/0052706 A1 | 2/2014 | Misra et al. | |
| 2015/0169471 A1 | 6/2015 | Burka et al. | |
| 2015/0213032 A1 * | 7/2015 | Powell | G06F 17/30079 |
| | | | 707/827 |

OTHER PUBLICATIONS

Alba et al., "Efficient and Agile Storage Management in Software Defined Environments" 12 pages, IBM Journal of Research and Development, vol. 58, No. 2/3, Paper 5, Mar./May 2014.

* cited by examiner

*Primary Examiner* — Edward Dudek, Jr.
(74) *Attorney, Agent, or Firm* — Griffiths & Seaton PLLC (57) ABSTRACT

Various embodiments for managing data objects stored in a tiered data object storage environment, by a processor device, are provided. In one embodiment, a method comprises using an application to provide directives to the tiered data object storage environment for manipulating and managing stored data objects such that data objects with a pending management operation are refrained from being migrated from a higher storage tier to a lower storage tier.

21 Claims, 6 Drawing Sheets

INTELLIGENT SNAPSHOT POINT-IN-TIME MANAGEMENT IN OBJECT STORAGE

BACKGROUND OF THE INVENTION

1. Field of the Invention

The present invention relates in general to computing systems, and more particularly, to various embodiments for managing data objects stored in a tiered data object storage environment.

2. Description of the Related Art

In today's society, computer systems are commonplace. Computer systems may be found in the workplace, at home, or at school. As computer systems become increasingly relied upon, convenient, and portable, the Internet has grown exponentially. Now more than ever, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments for managing data objects stored in a tiered data object storage environment, by a processor device, are provided. In one embodiment, a method comprises using an application to provide directives to the tiered data object storage environment for manipulating and managing stored data objects such that data objects with a pending management operation are refrained from being migrated from a higher storage tier to a lower storage tier.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Described embodiments, and illustrative figures of various embodiments for managing data objects stored in a tiered data object storage environment are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Various methods exist for creating data redundancy. For example, a function such as a snapshot function enables an administrator to make point-in-time, full volume copies of data, with the copies immediately available for read or write access. The snapshot can be used with standard backup tools that are available in the environment to create backup copies on tape. A snapshot function creates a copy of a source volume on a target volume. This copy, as mentioned above, is called a point-in-time copy. When a snapshot operation is initiated, a relationship is created between a source volume and target volume. This relationship is a "mapping" of the source volume and the target volume. This mapping allows a point-in-time copy of that source volume to be copied to the associated target volume. The relationship exists between this volume pair from the time that the snapshot operation is initiated until the storage unit copies all data from the source volume to the target volume, or the relationship is deleted.

When the data is physically copied, a background process copies data from the source volume to the target volume. The amount of time that it takes to complete the background copy depends on various criteria, such as the amount of data being copied, the number of background copy processes that are running and any other activities that are presently occurring. The snapshot function works in that the data which is being copied does not actually need to be copied instantaneously, it only needs to be copied just prior to an update causing on overwrite of any old data on the source volume. So, as data changes on the source volume, the original data is copied to the target volume before being overwritten on the source volume.

Therefore, a snapshot is a feature supported on various storage devices that allows a user or an automated process to make nearly instantaneous copies of entire logical volumes of data. A copy of a source disk is made on a target disk. The copies are immediately available for both read and write access. A common feature of snapshot like implementations is the ability to reverse the copy. That is, to populate the source disk of a snapshot map with the contents of the target disk. It is also possible to use snapshot in cascaded implementations, in which a target disk later becomes the source disk for a further snapshot or vice versa.

A cascaded configuration of storage volumes is described in detail in U.S. Pat. No. 7,386,695. It is also possible to create multiple cascades of storage volumes which are interlocking at a logical level. A first cascade may comprise storage volumes A, B, C and D which are arranged in a cascade as follows: A ↔ B ↔ C ↔ D, while at a later time a new backup of A may be started that ultimately leads to the creation of A ↔ E ↔ F. Many different combinations of snapshot functions and reversed functions are possible, potentially creating complicated multiple cascading storage volumes.

A typical use case for multiple target snapshot is to create a number of application consistent snapshots of a production disk (the source volume of the flashcopies). This is done using some form of a consistency group in order to guarantee that all the copies are identical.

The mechanisms illustrated below may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Figure 1:
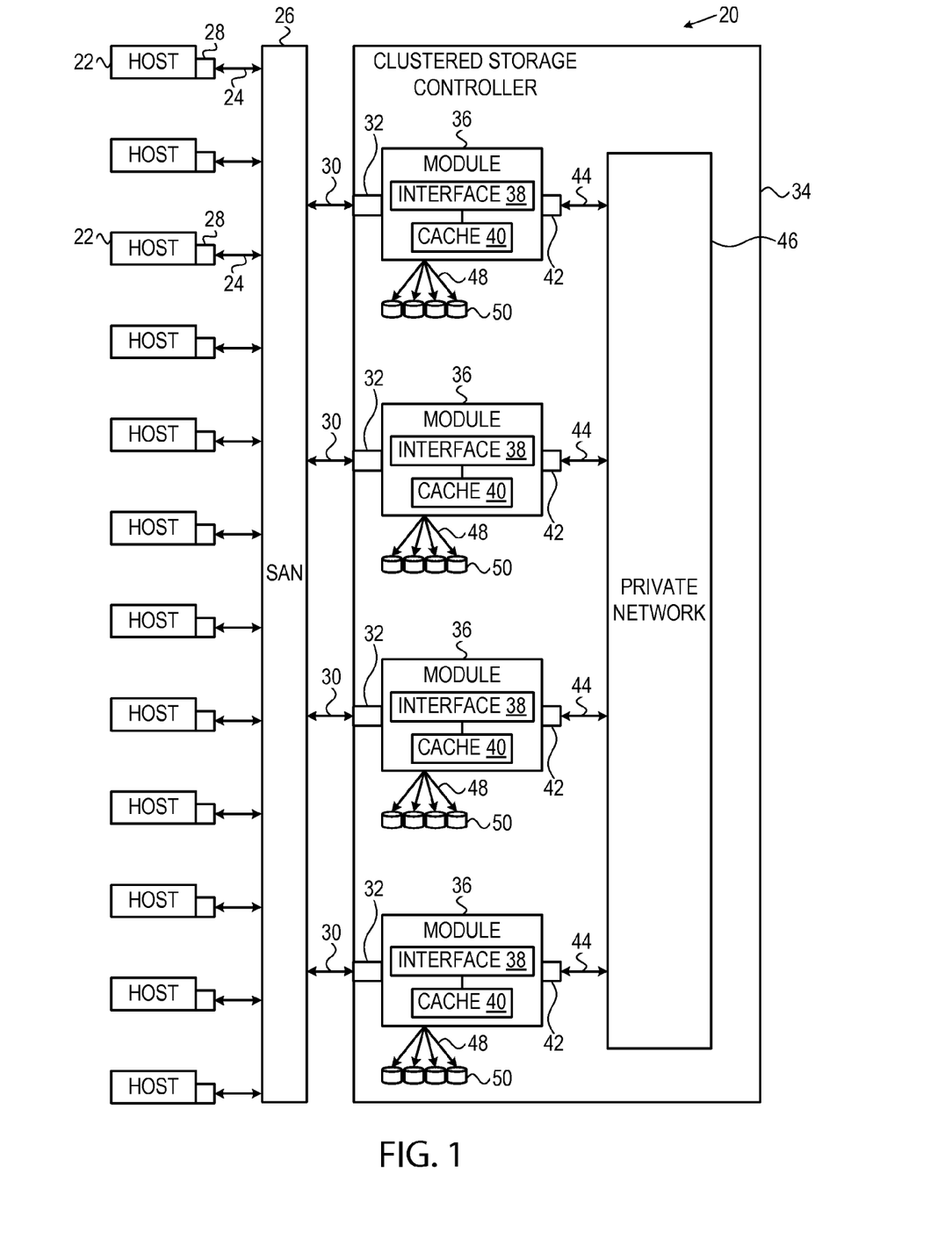
FIG. 1 illustrates a block diagram of a computer storage environment in which aspects of the present invention may be realized.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
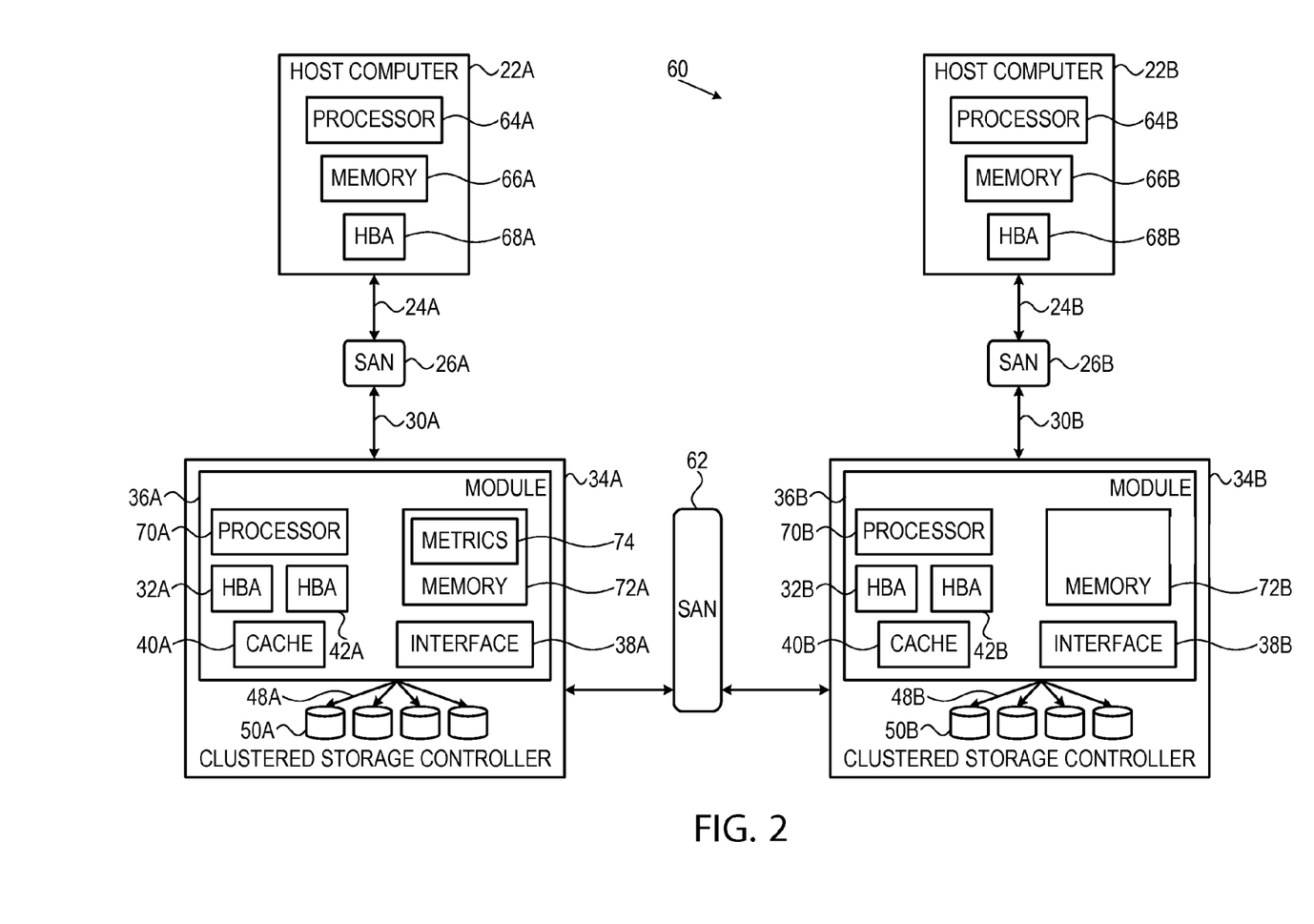
FIG. 2 illustrates a block diagram of a hardware structure of a data storage system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail herein below, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Distributed storage (i.e. cloud storage) is primarily comprised of object storage at massive scale. Object storage provides very little control over manipulating point-in-time snapshot copies of data generated by storage subsystems such as members of the IBM Storwize™ family, IBM Spectrum Control™, NetApp FAS6200™, etc. For example, object storage offers simple Representational State Transfer (REST) Application Programming Interface (API) commands such as GET, PUT, and DELETE.

In the case of backup/restore and copy data management, a storage controller such as the IBM Storwize V7000™ may generate an initial full backup followed by several incremental backups and push them to the object storage. The backups may be controlled via a policy such that a backup is taken every few hours (e.g. 4 hours). Over time, the amount of backup points-in-time stored in the environment grows tremendously and it is unnecessary to keep multiple point-in-time copies of data at these intervals once the points-in-time are have aged more than a week old (as an example). In order to save space, there is a need to merge/collapse point-in-time backups in the object storage according to a user defined policy. No interface currently exists to perform these operations within object storage.

There may be the need to update the point-in-time of the full copy in the object storage in order to improve efficiency in the event of a disaster recovery operation. The most likely scenario during a disaster recovery is to recover data from the point-in-time nearest to production. In order to recover from a disaster, it is necessary to restore a full volume from the object storage and then apply restore points from incremental backups repetitively until the desired point-in-time is achieved. If a substantial amount of time has passed since the initial full backup was obtained, it would mean performing many incremental restore operations from the object storage after performing the full restore.

Additionally, a user may request to delete point-in-time snapshots from the object storage. In order to maintain the ability to restore from any point-in-time from the object storage, a snapshot bitmap cascade must be preserved. Deleting snapshot bitmaps in the middle of the data chain from the object storage inevitably breaks the data chain.

The object storage target that stores the snapshot backups as objects and that also supports the above commands and operations (collapse, move full forward, delete, etc.) may have a low cost storage tier associated with it, which has much different performance characteristics.

Figure 3:
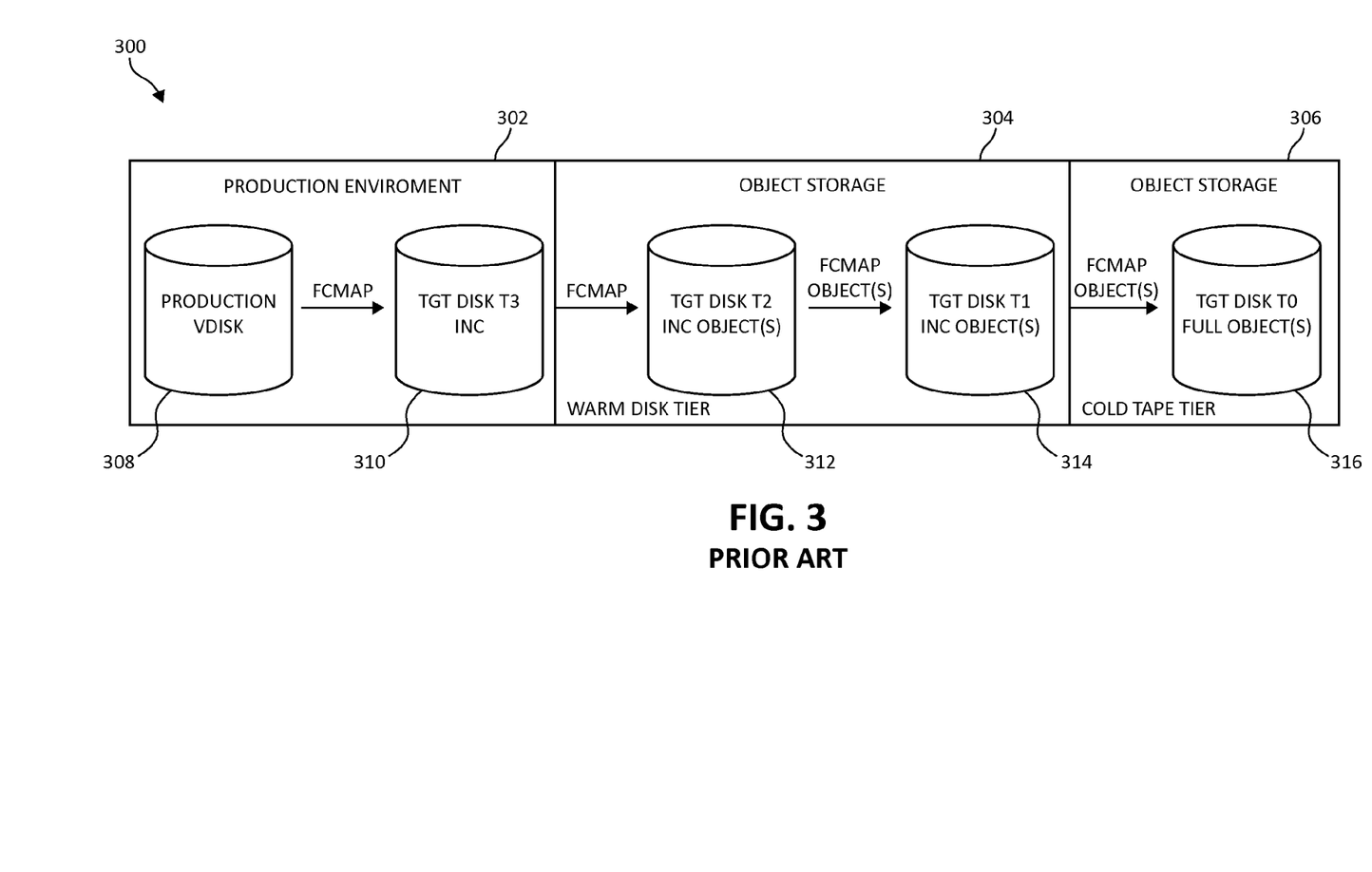
FIG. 3 illustrates a block diagram of a prior art object storage environment.

FIG. 3 illustrates a block diagram 300 of a prior art object storage environment relating to that discussed above. Diagram 300 illustrates an example background environment for understanding the mechanisms of the present invention and shows cascaded full and incremental snapshot data stored between multiple storage tiers. Illustrated is a production environment 302, object storage provided in a higher (warm/disk) tier 304, and object storage provided in a lower (cold/tape) tier 306. In the production environment 302 is a production vdisk 308, and each snapshot point-in time contains one or more target volumes, namely T0 Tgt Disk 316 in the lower tier 306, T1 Tgt Disk 314 and T2 Tgt Disk 312 in the higher tier 304, and T3 Tgt Disk 310 in the production environment 302. Each snapshot point-in-time also contains one or more snapshot maps (fcmap).

The underlying problem is that point-in-time management operations may need to access data from the lower tier, which causes unnecessary overhead in the object storage. Further these management operations may interfere with customer initiated commands (e.g. GET commands) from the top end of the object store, which translates, to having to recall data from the lower tier.

Figure 4:
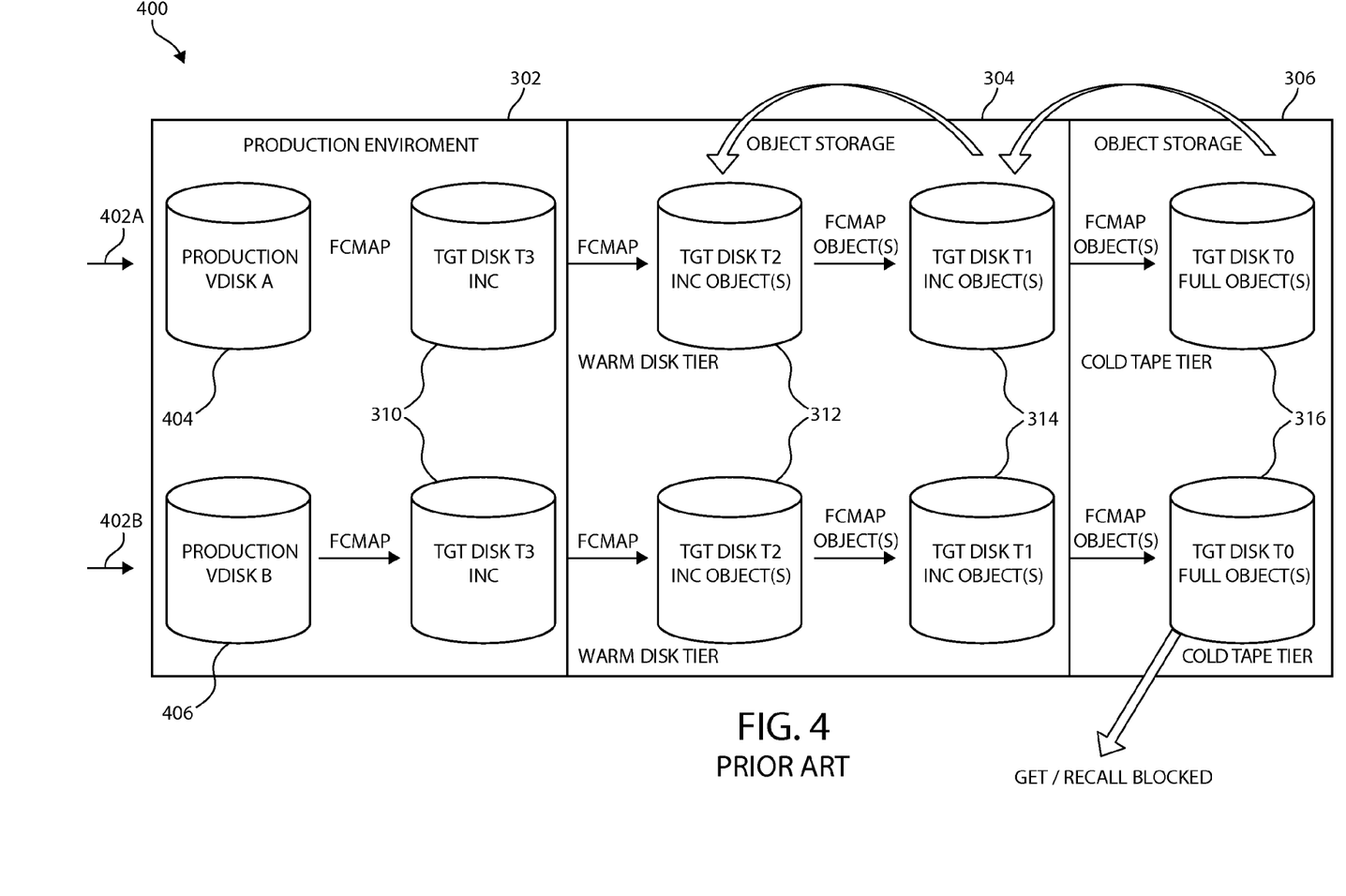
FIG. 4 illustrates an additional block diagram of a prior art object storage environment.

FIG. 4 illustrates this issue in a scenario of moving the full object forward to point-in-time T2 while a user initiates a GET command for a different object in the cold tier. FIG. 4 illustrates this scenario in a block diagram 400. Illustrated is the production environment 302, the object storage provided in a higher (warm/disk) tier 304, and the object storage provided in a lower (cold/tape) tier 306. In the production environment 302 is the production vdisk 308, and each snapshot point-in time contains one or more of the target volumes, namely T0 Tgt Disk 316 in the lower tier 306, T1 Tgt Disk 314 and T2 Tgt Disk 312 in the higher tier 304, and T3 Tgt Disk 310 in the production environment 302. Each snapshot point-in-time also contains the one or more snapshot maps (fcmap).

Diagram 400 illustrates a move full forward operation 402A from point-in-time T0 Tgt Disk 316 to point-in-time T2 Tgt Disk 312 for production vdisk A 404. This results in a recall of T0 Tgt Disk 316 from the object storage. In parallel, a GET command operation 402B is issued for T0 Tgt Disk 316 for production vdisk B 406. This operation is blocked since the lower tier is already performing a recall for the move full forward command in operation.

Accordingly, the mechanisms of the present invention prevent unnecessary recalls from the lower tier in the object store from taking place when a management operation is pending, such as performing a delete, move full forward, prune, and collapse of point-in-time copies of production volumes mapped to objects. Further, these mechanisms also prevent writing data to tape only to have it deleted a short time later. These features are employed by adding intelligence in the overall system to ensure that data objects are not migrated to a lower tier (e.g. tape) if they have the pending management operation associated with them.

The mechanisms of the present invention enable applications such as IBM Spectrum Virtualize™ to provide directives to the object storage service pertaining to the management of full and incremental snapshot points-in-time stored within the environment. The storage service provider will interpret these directives in order to perform functions such as: collapse points-in-time, move the full backup forward in time, delete points-in-time, reconcile points-in-time, update directives, and provide status on operations.

In one embodiment, the application may set directives to the object storage providing guidance with respect to the time to migrate specific objects to the lower (tape) tier. These directives are tightly integrated with point-in-time management operations to ensure that data is not unnecessarily recalled from tape.

Figure 5:
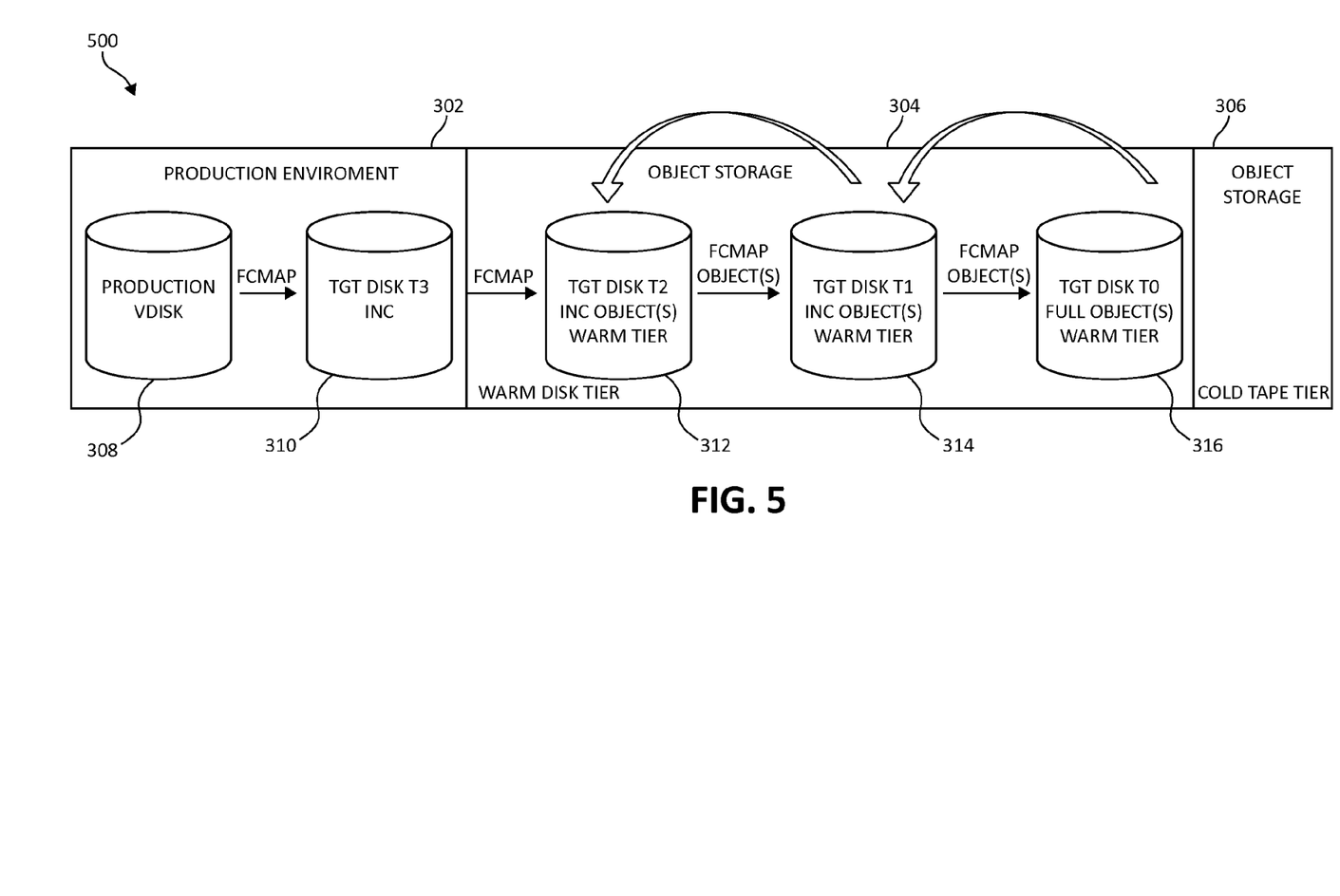
FIG. 5 illustrates a block diagram of an object storage environment depicting aspects of the present invention.

FIG. 5 illustrates a block diagram 500 providing an example of the aforementioned. For example, in the aforementioned case of moving the data object full forward from point-in-time T0 Tgt Disk 316 to point-in-time T2 Tgt Disk 312 for production vdisk 308, the application may send a directive to the object store indicating that point-in-time objects T0 Tgt Disk 316, T1 Tgt Disk 314, and T2 Tgt Disk 312 should not be moved to the lower tier 306. Further upon invocation of the management operation to move the full forward operation, the application may instruct the object storage to move objects to the lower tier 306, delete objects, etc., after the management operation completes.

Figure 6:
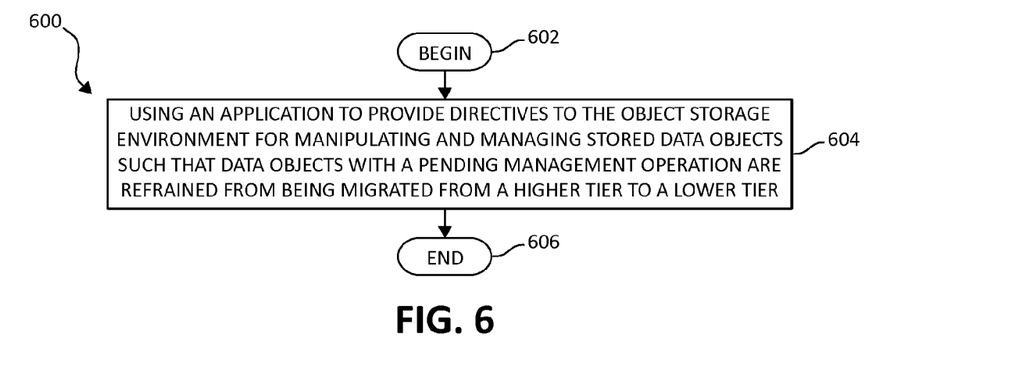
FIG. 6 illustrates a flow chart of a method for managing data objects stored in a tiered data object storage environment.

Continuing to FIG. 6, a method 600 for managing data objects stored in a tiered data object storage environment is illustrated, in accordance with one embodiment of the present invention. Starting at step 602, an application is used to provide directives to the tiered data object storage environment for manipulating and managing stored data objects such that data objects with a pending management operation are refrained from being migrated from a higher storage tier to a lower storage tier (step 604). The method ends (step 606).

Under the mechanisms illustrated herein, the tagging of data objects to keep them in the higher (warm) tier may be performed using a variety of methods between the application and the object storage service. Examples of these methods include, but are not limited to, a REST API, an extensible markup language (XML) document, and/or a separate socket interface.

In one embodiment, using the example of a REST API, the application may provide a new API command for the data object store to interpret that controls the management of placing data on the lower tier which is coordinated with the point-in-time management tasks. Additionally, or alternatively, the API may set extended attributes in each data object, which provides instructions that the object store extracts and interprets. The application may also be able to query the location of a data object (determining whether on a lower tape tier or higher disk tier), as well as the status of in progress management operations.

In case of unexpected placement of data on lower storage tiers in the object store, the application may instruct the object store to prefetch the appropriate data from the lower tier ahead of the operation in order to streamline production. Further in the case of error recovery, such as a situation where the production environment becomes disconnected from the object store for an extended period of time such that the object store does not receive any directives, an existing policy and/or history operations may be used to make an intelligent estimation about which data objects should be migrated between storage tiers, and at what time.

Additionally, if such were the case where data is inadvertently migrated to a lower tier and a point-in-time management operation needs to take place, the data objects associated with snapshot bitmaps may be left on the higher tier such that the bitmaps may be manipulated to point at different objects on the lower tier without having to recall and rewrite the tape on the lower tier. In this model, old data is simply marked for delete or overwrite.

The coordination and intelligence of the application to correlate point-in-time management operations with the optimal placement of data in the appropriate object storage tier, and more specifically its ability to be aware of production in a lower tier in an object store, along with the object store's ability to take the appropriate action based on the instruction of the application, provides an optimal end to end solution.

Figure 7:
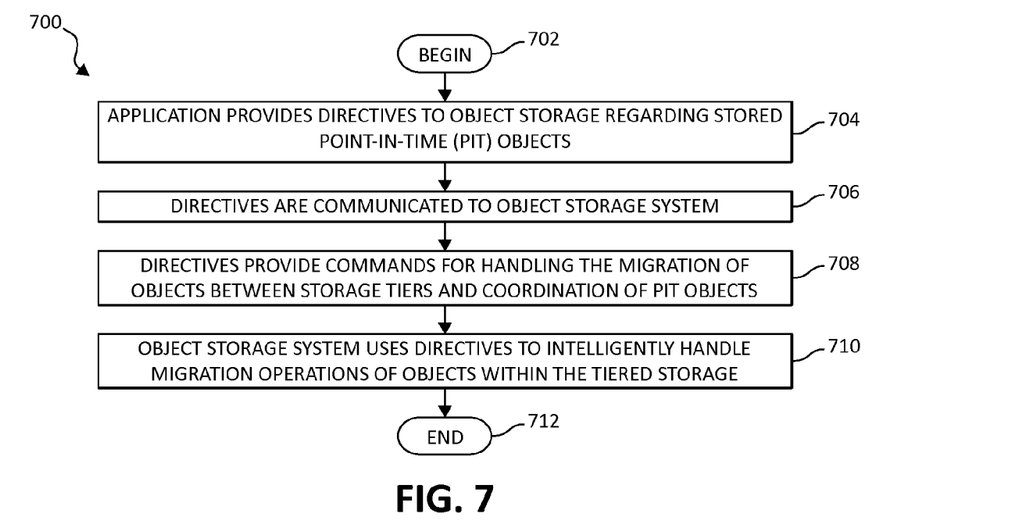
FIG. 7 illustrates an additional flow chart of a method for managing data objects stored in a tiered data object storage environment.

FIG. 7 illustrates a flow chart of a method 700 for managing data objects stored in a tiered data object storage environment, reviewing the aforementioned features of the present invention. Beginning at step 702, an application provides directives to an object store regarding stored point-in-time data objects (step 704). The directives are communicated to the object storage system through the object storage service provider using the aforementioned techniques (step 706). The directives provide commands for handling the migration of objects between storage tiers and the coordination of point-in-time objects (step 708). Finally, the object storage system uses the directives to intelligently handle the migration operations of the data objects within the tiered storage environment (step 710). The method ends (step 712).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data objects stored in a tiered data object storage environment, by a processor device, comprising:
   using an application to provide directives to the tiered data object storage environment for manipulating and managing stored data objects such that data objects with a pending management operation are refrained from being migrated from a higher storage tier to a lower storage tier.

2. The method of claim 1, wherein the management operation comprises a function relating to the management of stored full and incremental snapshot point-in-time (PIT) data, and the tiered data object storage environment is operated by a storage service provider.

3. The method of claim 1, further including providing the directives, by the application, by performing one of:
   tagging the data objects with a pending management operation by providing a command interpreted by the tiered data object storage environment; and
   setting extended attributes in the data objects providing management instructions interpreted by the tiered data object storage environment.

4. The method of claim 1, further including querying, by the application, a location of the data objects including the status of the pending management operation; and
   prefetching the data objects from the lower storage tier to the higher storage tier to streamline the pending management operation.

5. The method of claim 2, further including, for data objects stored in the lower storage tier with the pending management operation, pointing from data objects associated with a snapshot bitmap on the higher storage tier to existing data objects stored in the lower storage tier.

6. The method of claim 1, further including using an existing policy developed by a history of directives to intelligently estimate which of the data objects are to be migrated between the higher storage tier and the lower storage tier and at what appropriate time.

7. The method of claim 3, wherein the application provides the directives to the storage service provider using one of an application programming interface (API), an extensible markup language (XML) document, and a separate socket interface.

8. A system for managing data objects stored in a tiered data object storage environment, the system comprising:
a tiered data storage environment comprising a plurality of storage volumes;
an application in communication with the tiered data storage environment; and
at least one processor device, wherein the processor device:
uses an application to provide directives to the tiered data object storage environment for manipulating and managing stored data objects such that data objects with a pending management operation are refrained from being migrated from a higher storage tier to a lower storage tier.

9. The system of claim 8, wherein the management operation comprises a function relating to the management of stored full and incremental snapshot point-in-time (PIT) data, and the tiered data object storage environment is operated by a storage service provider.

10. The system of claim 8, wherein the at least one processor device provides the directives, by the application, by performing one of:
tagging the data objects with a pending management operation by providing a command interpreted by the tiered data object storage environment; and
setting extended attributes in the data objects providing management instructions interpreted by the tiered data object storage environment.

11. The system of claim 8, wherein the at least one processor device queries, by the application, a location of the data objects including the status of the pending management operation; and
prefetches the data objects from the lower storage tier to the higher storage tier to streamline the pending management operation.

12. The system of claim 9, wherein the at least one processor device, for data objects stored in the lower storage tier with the pending management operation, points from data objects associated with a snapshot bitmap on the higher storage tier to existing data objects stored in the lower storage tier.

13. The system of claim 8, wherein the at least one processor device uses an existing policy developed by a history of directives to intelligently estimate which of the data objects are to be migrated between the higher storage tier and the lower storage tier and at what appropriate time.

14. The system of claim 10, wherein the application provides the directives to the storage service provider using one of an application programming interface (API), an extensible markup language (XML) document, and a separate socket interface.

15. A computer program product for managing data objects stored in a tiered data object storage environment, by a processor device, the computer program product embodied on a non-transitory computer-readable storage medium having computer-readable program code portions stored therein, the computer-readable program code portions comprising:
an executable portion that uses an application to provide directives to the tiered data object storage environment for manipulating and managing stored data objects such that data objects with a pending management operation are refrained from being migrated from a higher storage tier to a lower storage tier.

16. The computer program product of claim 15, wherein the management operation comprises a function relating to the management of stored full and incremental snapshot point-in-time (PIT) data, and the tiered data object storage environment is operated by a storage service provider.

17. The computer program product of claim 15, further including an executable portion that provides the directives, by the application, by performing one of:
tagging the data objects with a pending management operation by providing a command interpreted by the tiered data object storage environment; and
setting extended attributes in the data objects providing management instructions interpreted by the tiered data object storage environment.

18. The computer program product of claim 15, further including an executable portion that queries, by the application, a location of the data objects including the status of the pending management operation; and
prefetches the data objects from the lower storage tier to the higher storage tier to streamline the pending management operation.

19. The computer program product of claim 16, further including an executable portion that, for data objects stored in the lower storage tier with the pending management operation, points from data objects associated with a snapshot bitmap on the higher storage tier to existing data objects stored in the lower storage tier.

20. The computer program product of claim 15, further including an executable portion that uses an existing policy developed by a history of directives to intelligently estimate which of the data objects are to be migrated between the higher storage tier and the lower storage tier and at what appropriate time.

21. The computer program product of claim 17, wherein the application provides the directives to the storage service provider using one of an application programming interface (API), an extensible markup language (XML) document, and a separate socket interface.

* * * * *